United States Patent [19]

Zimmer, Jr.

[11] 4,034,946

[45] July 12, 1977

[54] MOUNTING DEVICE FOR LIGHTS

[75] Inventor: Judson Zimmer, Jr., Gloversville, N.Y.

[73] Assignee: N. A. Taylor Co. Inc., Gloversville, N.Y.

[21] Appl. No.: 717,145

[22] Filed: Aug. 24, 1976

[51] Int. Cl.² .................................... F16M 11/12
[52] U.S. Cl. ............................ 248/183; 248/278; 403/157; 403/315
[58] Field of Search ......... 248/178, 183, 184, 185, 248/186, 82, 84, 86, 88, 284, 291, 278; 403/157, 158, 315, 316, 319, 354; 240/81 BC, 81 BD, 81 BE; 16/171, 176

[56] References Cited

U.S. PATENT DOCUMENTS

| 1,182,123 | 5/1916 | Welles | 248/278 |
| 1,211,347 | 1/1917 | Plofchan et al. | 248/278 |
| 2,459,676 | 1/1949 | Axtell | 248/183 |
| 2,790,617 | 4/1957 | Harland | 248/183 |
| 3,816,010 | 6/1974 | DiGago | 403/157 |

FOREIGN PATENT DOCUMENTS

| 1,088,373 | 9/1960 | Germany | 403/316 |
| 31,330 | 11/1933 | Netherlands | 16/176 |
| 173,367 | 1/1922 | United Kingdom | 403/354 |
| 515,936 | 12/1939 | United Kingdom | 248/184 |

Primary Examiner—Marion Parsons, Jr.
Attorney, Agent, or Firm—Bierman & Bierman

[57] ABSTRACT

A mount for removably mounting a light to a base member comprising a pair of clevis members. One clevis member is provided with a pair of upstanding spaced arms in which a stem is journaled for rotation and linear translation. A bushing having teeth thereon is mounted on the stem and translatable therewith. The second clevis is provided with a pair of depending arms defining a groove therebetween which fits over the stem within the upstanding arms of the first clevis. At least one face of the second clevis contains teeth which cooperate with the teeth on the bushing to secure one clevis to the other, the bushing being translatable away from the second clevis to permit repositioning and removal of the second clevis.

17 Claims, 5 Drawing Figures

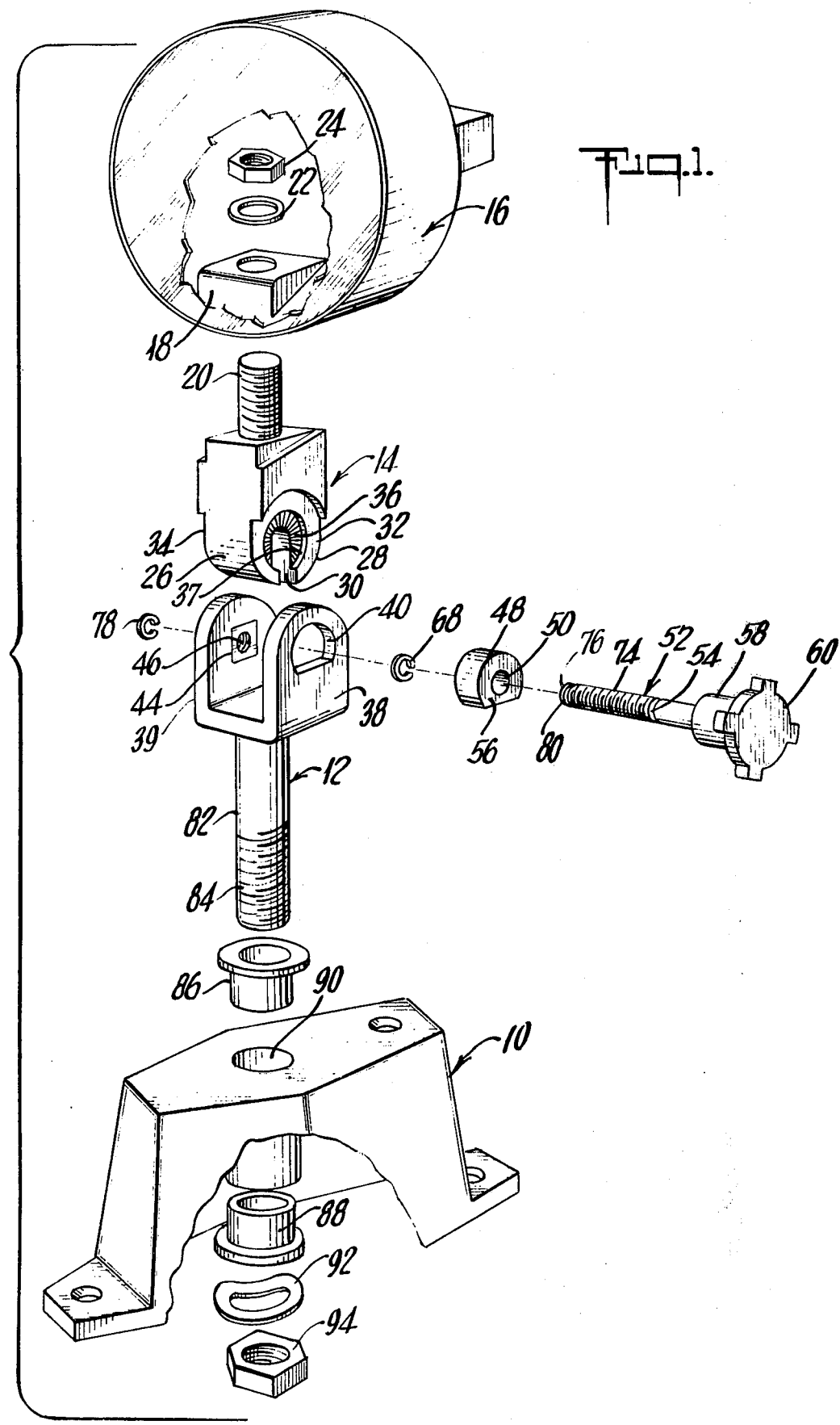

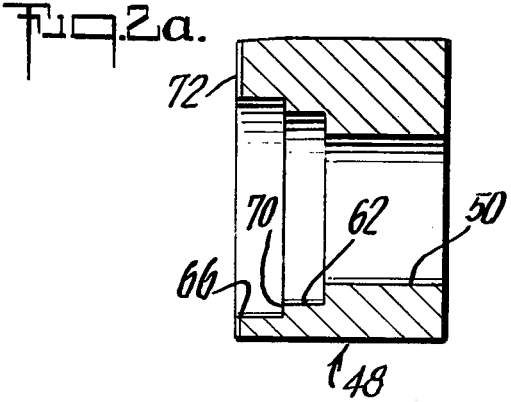
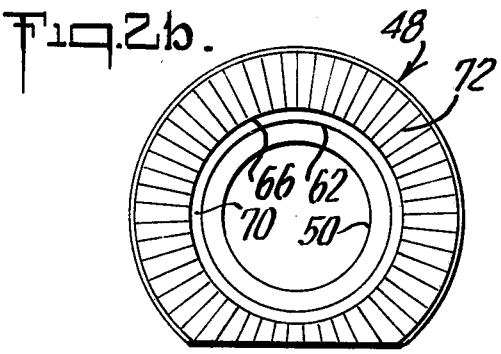
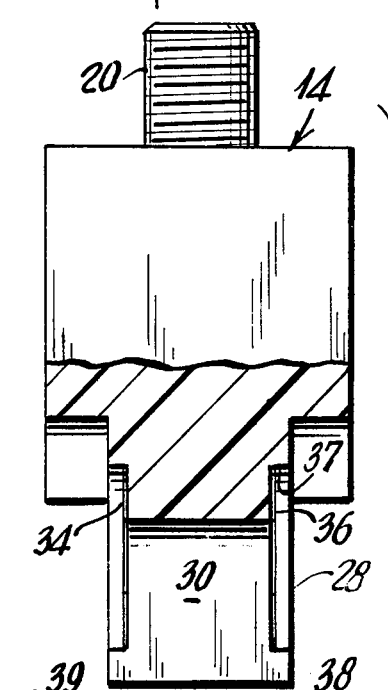
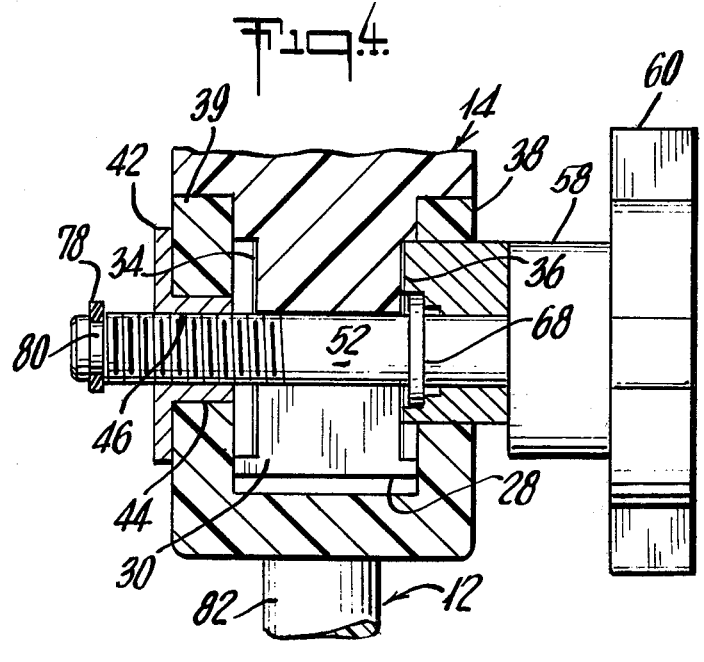
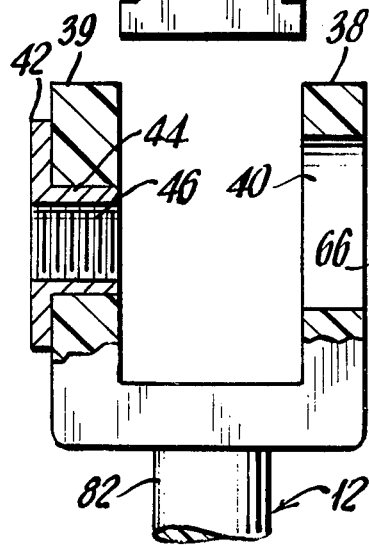
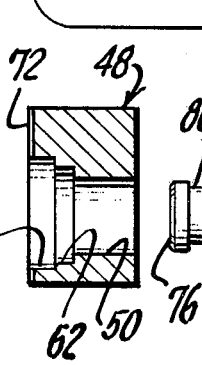
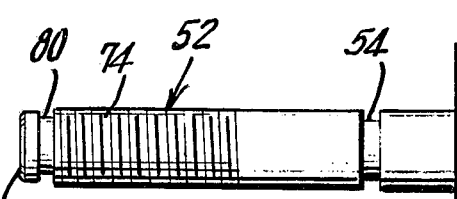
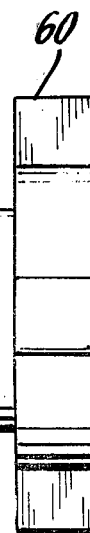

MOUNTING DEVICE FOR LIGHTS

This invention relates to mounts for mounting lights, in particular spotlights, to a base.

In accordance with the present invention, a pair of clevises are used to mount an object, in particular a spotlight, to a base. The spotlight is mounted to one clevis. The other clevis is used to mount the spotlight and its associated clevis to the base.

The first clevis is provided with a pair of upstanding arms within which a stem is rotatably mounted, the second clevis having a pair of arms defining a groove between them.

The groove in the first clevis mounts on the stem in the second clevis. The stem is linearly translatable in the first clevis when the stem is rotated. Gripping means are mounted on the stem, the gripping means being linearly translatable with the stem both toward and away from the second clevis.

Cooperating gripping means are provided on the second clevis for receiving the gripping means on the stem. Translation of the gripping means located on the stem into engagement with the cooperating gripping means on the second clevis secures the first clevis to the second clevis to complete the mounting of the spotlight to the base.

Reverse rotation of the stem moves its associated gripping means away from the second clevis thereby permitting the grooved clevis to be pivoted on the stem to a new position, after which it can be secured in place by simply rotating the stem to move the stem mounted gripping means into engagement with the cooperating gripping means. Removal of the one clevis from the other to permit separation of the spotlight from the base is achieved in the same manner — by simply backing off the gripping means on the stem and separating the first clevis from the second clevis.

Referring now to the drawings in which like numerals refer to like parts and in which a preferred embodiment of the invention is described:

FIG. 1 is an exploded view of the assembly of elements of the present invention;

FIG. 2a is a side detail view of the gripping means of FIG. 1;

FIG. 2b is a front view of the gripping means of FIG. 2a;

FIG. 3 is a plan view showing the assembly of stem and gripping means in their associated clevis; and FIG. 4 is a plan view showing one clevis assembled in place in the other.

In the drawings, 10 denotes the base, 12 denotes a lower clevis, 14 denotes an upper clevis and 16 denotes a spotlight. As shown in the drawing, the spotlight is provided with an internal depression denoted by the numeral 18 which accepts the threaded stem 20 of clevis 14. A conventional lock washer 22 and nut 24 mount to the threaded stem 20 to firmly secure the spotlight 16 to the clevis 14.

Clevis 14 is provided with a pair of depending arms 26 and 28 which define a groove 30 between them. The groove 30 opens into opposed faces 32 and 34 of the clevis, the faces being recessed into the body of the clevis as shown in the drawing.

Partially surrounding the groove 30 is a plurality of radial teeth 36. Although radial teeth 36 may be placed on only one face, such as face 32, it is to be understood that a corresponding set of radial teeth may be placed on face 34 if desired. The radial teeth are recessed into their corresponding faces 32, 34, thereby forming a shoulder 37 which surrounds the teeth.

Lower clevis 12 is provided with a pair of upstanding arms 38 and 39, each of which has an out of round hole 40, 44 therein. A bushing 42 having an external out of round envelope corresponding to hole 44 is mounted in the hole. Bushing 42 is internally threaded at 46.

An out of round bushing 48 is adapted to mount into and slide with respect to out of round hole 40. The outer envelope of bushing 48 corresponds geometrically to the shape of hole 40.

Bushing 48 is provided with a first bore 50 in which stem 52 is journaled. When assembled, bushing 48 will be positioned on stem 52 to the right of groove 54, face 56 of the bushing being in contact with the shoulder 58 created at the junction of stem 52 and the knob 60.

Bore 50 opens into a larger bore 62 which in turn opens up into a still larger bore 66. A retainer 68 is snapped into place in groove 54 after the installation of bushing 48. As can be appreciated from the drawings, retainer 68 rests against the shoulder 70 created between the first and second bores 66 and 62. The snap ring 68 and shoulder 58 prevent sliding movement of the bushing 48 along the shaft 52.

The face 72 of bushing 48 contains a plurality of teeth adapted to cooperate with teeth 36 on upper clevis 14 as will be more fully explained below.

After bushing 48 and retainer 68 have been mounted on the stem, the stem is threaded into hole 40 until bushing 48 seats therein. Screw threads 74 on the end of the stem engage with the cooperating screw threads 46 in bushing 42. Rotation of the stem in a selected direction will result in the emergence of end section 76 of the stem on the outside of bushing 42, substantially as shown in FIG. 4. Snap ring 78 is then secure in groove 80 to complete the assembly of stem 52 to clevis 12.

Clevis 12 is provided with a stem 82 having a threaded end 84. A pair of bushings 86 and 88 journal the shaft 82. Bushing 86 is mounted into the upper end of sleeve 90 and base 10, and bushing 88 is mounted into the lower end of sleeve 90. Threaded end 84 extends past lower bushing 88 and is engaged by a bowed spring washer 92 and secured to the base by a conventional nut 94. Nut 94 is tightened to compress bowed washer 92 to provide a friction force against nut 94. The friction force can be adjusted by tightening or loosening nut 94 to thus increase or decrease the drag opposing rotation of stem 12. It can be appreciated that the particular mounting of the clevis to the base will retain the entire mount structure in a selected position yet will permit rotational movement of the spotlight with respect to the base.

To assemble the spotlight to the base, the upper clevis 14 is lowered so that the groove 30 straddles stem 52. Stem 52 is rotated by a handle or knob 60. Rotation of the stem translates the entire stem to the left through the medium of cooperating screw threads 74, 46 on the stem and in bushing 42, respectively. Bushing 48 containing teeth 72 is linearly translated with the stem into engagement with radial teeth 36 to thereby secure clevis 14 in the lower clevis 12.

The upper clevis 14 can be rotated in a vertical plane on the stem by partially backing off the stem 52 and the bushing 48 in which it is journaled until teeth 72 on bushing 48 and teeth 36 on clevis 14 disengage. If the stem 52 is not backed out too much, the periphery of bushing 48 will remain engaged in recess 37, thus retaining the engagement between the upper and lower clevises via bushing 48, yet permitting rotation of the clevis 14. When a new position has been selected, knob 60 is again turned to translate the stem 52 and bushing 48 to engage clevis 14.

To remove the upper clevis 14 and the spotlight 16, one simply backs off on the stem 52 to completely remove the bushing 48 from recess 37, thus releasing the engagement between bushing 48 and clevis 14 and allowing complete removal of clevis 14 and the spotlight.

It can be readily appreciated that the mounting system described herein is simple to use and does not require the removal of the stem or other parts in order to permit disengagement of the spotlight from the base to which it is mounted. In addition, the same structure which provides for the ready disengagement of the spotlight 16 also provides for the rotation of the spotlight with respect to the base without having to remove the stem.

Many modifications can be made to the apparatus described and shown. Further, teeth 36 and 72 on clevis 14 and bushing 48, respectively, may be replaced by other types of gripping surfaces, such as sand paper. Any material which will serve to secure one clevis to the other and retain a selected angular position of the spotlight 16 can be used to advantage.

Many other modifications will occur to those skilled in the art. It is intended to cover all such modifications which fall within the spirit and scope of the invention defined in the claims appended hereto.

I claim:

1. A mount for removably mounting a light to a base member comprising first and second clevis members, means on one of said first and second clevises for mounting said light, and means on the other clevis for mounting the clevis to the base, said first clevis having a pair of arms defining a groove therebetween, said groove terminating in opposed faces of said first clevis, a gripping means on at least one of said opposed faces a pair of spaced arms on said second clevis, each of said spaced arms having a hole therein, the holes in said spaced arms being in alignment with each other, a stem, means for mounting said stem in said spaced holes and for permitting rotational movement of said stem in said spaced holes, said groove between the pair of arms in said first clevis straddling said stem between the said spaced arms of said second clevis, said stem having a cooperating gripping means thereon linearly translatable by rotation of said stem assembly, and located to cooperate with the gripping surface on said first clevis, said stem being rotatable to translate said cooperating gripping means between a first position in which said cooperating gripping means and gripping means engage each other to secure said first clevis in said second clevis and a second position in which said gripping surfaces are out of engagement to permit repositioning of said first clevis with respect to said second clevis and removal of said first clevis from said second clevis.

2. The mount according to claim 1 wherein gripping means are provided on both opposed faces of said first clevis.

3. The amount according to claim 1 wherein the said gripping means are recessed into the said opposed faces.

4. The mount according to claim 1 further comprising an opening in said base member, the means for mounting a clevis to said base member comprising a shaft on said clevis, and means for rotatably securing said shaft in said opening to permit rotation of said mount.

5. The mount according to claim 4 wherein said rotatable securing means comprises a pair of bushings each of which has a flange engaging opposing ends of said opening, said shaft extending through and beyond said bushings and having screw threads on the portion extending beyond the bushings, and a nut for engaging the screw threads to prevent removal of the shaft from said base.

6. The mount accordng to claim 1 wherein said cooperating gripping means comprises a bushing mounted on said stem and translatable upon rotation of said stem.

7. The mount according to claim 6 wherein the cooperating gripping means are substantially flush with the face of said bushing.

8. The mount according to claim 7 wherein the gripping means are recessed into said first clevis face and a shoulder surrounding said gripping means, said stem being rotatable to translate said bushing to a first position in which engagement between the gripping means and cooperating gripping means is released and said shoulder still engages said bushing to permit rotation of said first clevis while retaining said first clevis in contact with said bushing and to a second position in which said shoulder and bushing are out of contact to permit disengagement of said first clevis from said bushing.

9. The mount according to claim 6 wherein said bushing is slidably mounted in one of said holes, said stem being journaled in said bushing, cooperating screw thread means in the other of said holes and on the stem mounted therein whereby rotation of the stem will linearly translate the stem, and means for constraining said bushing to linearly translate with said stem.

10. The mount according to claim 9 wherein said means for constraining the bushing to linearly translate with the stem comprises a shoulder adjacent one face of said bushing, and retaining means adjacent the other face of said bushing.

11. The mount according to claim 9 wherein the hole in which said bushing is mounted is out of round, said bushing having an external shape corresponding to said out of round hole to prevent rotation of said bushing in said hole.

12. The mount according to claim 11 wherein said bushing has a first bore in which said stem is journaled, said first bore communicating with a second larger bore and forming a retaining shoulder at the junction of said first and second bores, said retaining means comprising a lock washer located in said second bore and adjacent said retaining shoulder, said second bore terminating in the said other face of the bushing, said other face containing said cooperating gripping means.

13. The mount according to claim 12 wherein said gripping means and cooperating gripping means each comprise a plurality of teeth cooperatively engageable to secure said first clevis in place in said second clevis.

14. The mount according to claim 9 wherein said cooperating screw thread means comprises an internally threaded bushing mounted in said other hole, said internally threaded bushing having an out of round exterior, said other hole being out of round and having a shape corresponding to said out of round threaded bushing to prevent rotation of said internally threaded bushing.

15. A mount for removably mounting a light to a base member comprising first and second clevis members, means on one of said clevis members for mounting said light and means on the other of said clevis members for mounting it to the base, said first clevis having a pair of arms defining a groove therebetween, said groove terminating in opposed faces of said first clevis, at least one of said opposed faces having a plurality of recessed teeth located adjacent said groove and a shoulder surrounding said recessed teeth, a pair of spaced arms on said second clevis each of which has an out of round hole thereon in axial alignment with each other, an internally threaded bushing mounted in one of said holes and having an external shape complementary thereto, a stem assembly journaled in the second bushing and having screw threads at one end for mating with the screw threads in said first bushing, a stem having a shoulder adjacent one of the faces of the second bushing and retaining means adjacent the other face of said second bushing, said other face having a plurality of teeth thereon for engaging the teeth on said first clevis, the arms of said first clevis straddling said stem, said stem being linearly translatable upon rotation between a first position in which the teeth on said second bushing are engaged with the teeth on said first clevis to secure the first clevis in said second clevis, and to a second position in which the teeth are disengaged to permit repositioning of the first clevis with respect to the second clevis and in which said shoulder engages the periphery of said bushing and to a third position in which removal of said first clevis from said second clevis is permitted.

16. The mount according to claim 15 wherein both said opposed faces are provided with a plurality of teeth.

17. The mount according to claim 15 wherein said second bushing has a first bore in which said stem is journaled, a second bore larger than the first bore in communication with the first bore, said retaining means being positioned internally of the second bore and against the junction between said first and second bores.

* * * * *